United States Patent Office 2,952,944
Patented Sept. 20, 1960

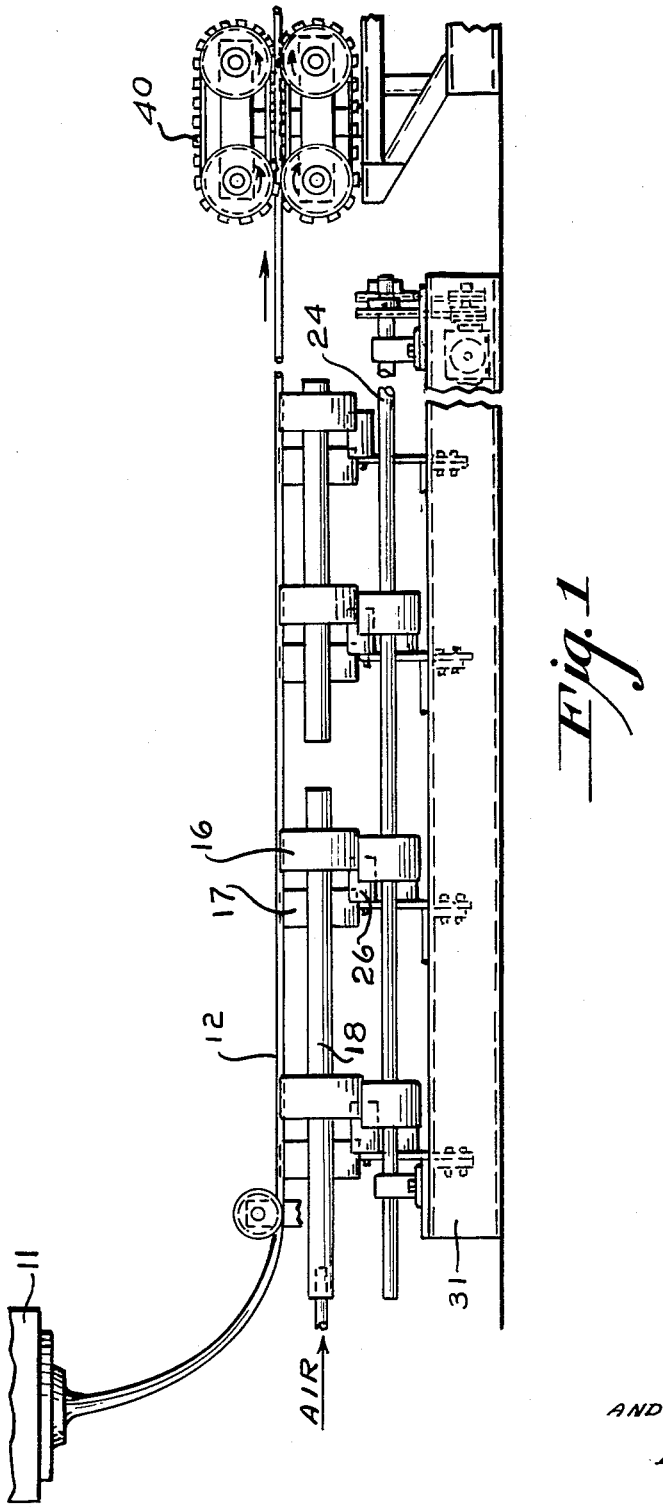

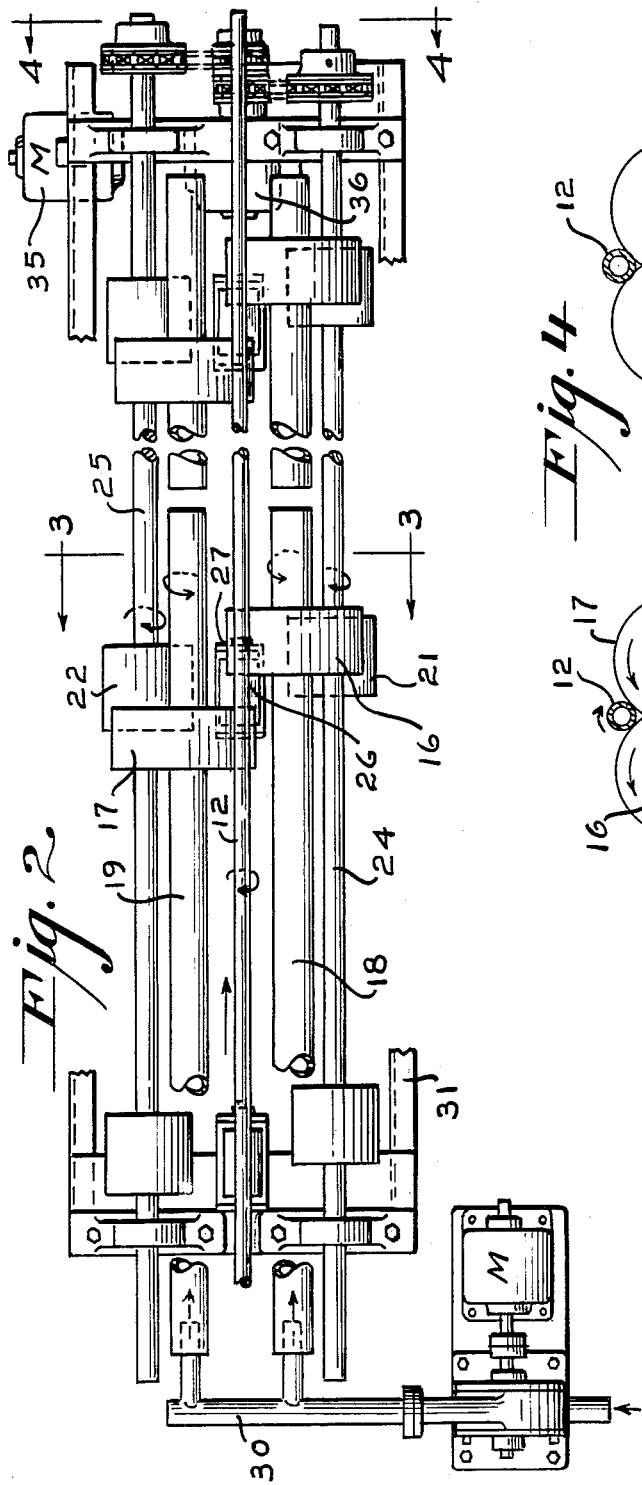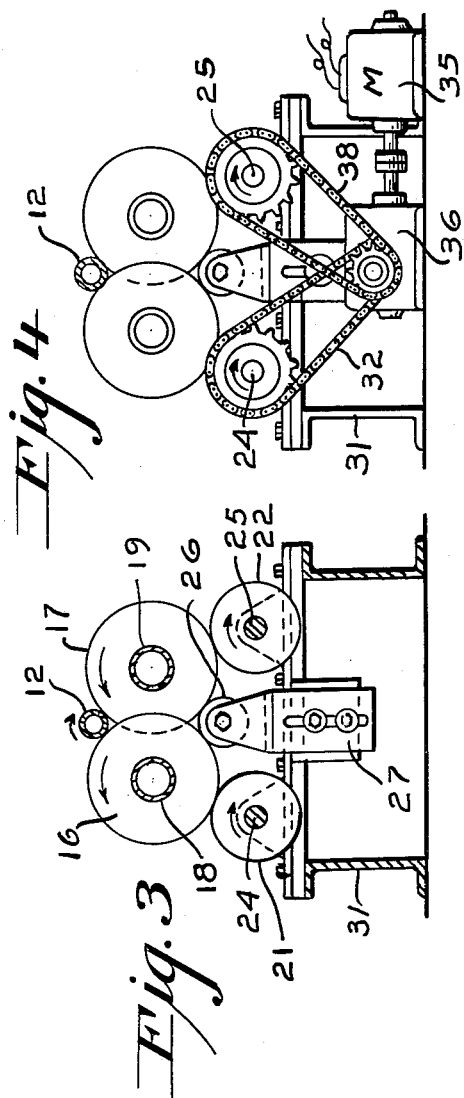

2,952,944

RUNWAY FOR SUPPORTING GLASS TUBING

Harold S. Given, Corning, N.Y., John C. E. Schwab, Parkersburg, W. Va., and Richmond W. Wilson, Corning, N.Y., assignors to Corning Glass Works, Corning, N.Y., a corporation of New York Filed Nov. 29, 1957, Ser. No. 699,616

6 Claims. (Cl. 49—17.1)

The present invention relates to glass tube and cane drawing, and particularly to improvements in continuous tube drawing systems.

It has been common practice in the past to continuously downwardly issue a solid or tubular body of molten glass from a parent supply source and to then change the course of travel of such body, while still in a plastic condition, to a horizontal path. Such body is then drawn along such path by means of a drawing mechanism located at a point remote from the parent source of glass.

To avoid the production of out of round work and to aid in the production of uniform wall tubing it has also been customary to impart a twisting action thereto while still in a plastic condition. This is ordinarily accomplished by so setting the drawing mechanism as to impart a turning movement to the hardened end of the work, the twisting action necessarily occurring in the still plastic portion thereof near the work source. The horizontal path for the work is usually provided by a runway which comprises a number of rollers suitably spaced from one another between the drawing mechanism and the work source. To aid in the distribution of the turning torque applied to the work it has also sometimes been customary to skew the rollers; i.e. have their plane of rotation inclined to the vertical plane of the axis of the tubing, as illustrated for example in United States Patent No. 2,009,326. Usually such rollers are composed of carbon or graphite, or have glass engaging surfaces of such material.

In the use of such supporting rollers, since they depend on the work rotating them, a roller sometimes fails to rotate, thereupon the surface of such a roller is quickly heated by the work and by the friction created between it and the work to a temperature at which marking of the work takes place. Such work not only has its appearance adversely effected, but in addition is unfit for certain uses.

According to the invention the horizontal work path is provided by a runway which comprises laterally disposed pairs of graphite rollers whose axes are parallel to the path of travel of the work, and preferably are supported on tubular shafts through which a cooling medium may be passed. Also the rollers are positively driven from an independent source at a surface speed corresponding to that imparted to the work by the drawing mechanism so as to uniformly distribute the turning torque to the work along its entire horizontal path. Moreover, facilities are provided for readily modifying the lateral spacing of the supporting rollers to appropriately support work of a broad range of diameters. Also, for convenience, such tubular shafts and their rollers are freely supported on driving rollers and thus are made easily replaceable.

For a full understanding of the invention reference is now made to the accompanying drawings wherein Fig. 1 is a side elevational view of a fragment of a work drawing apparatus in operation and of a drawing mechanism having associated therewith a runway or work supporting and rotating system embodying the invention.

Fig. 2 is a top plan view, on an enlarged scale, of a fragment of the work support with certain parts broken away and a piece of work supported thereon.

Fig. 3 is a view taken on line 3—3 of Fig. 2.

Fig. 4 is a view taken on line 4—4 of Fig. 2.

Referring to the drawings in detail the numeral 11 designates a fragment of a container of molten glass having a bottom outlet from which is issuing a stream of glass which may be solid or tubular in cross section, but which for convenience is hereinafter referred to as tubing 12. As will be observed, tubing 12 is supported at suitable intervals by a number of paired rollers, such as 16 and 17, supported on tubular shafts such as 18 and 19 (Fig. 2). It will be further observed that the tubular shafts such as 18 and 19 are in turn freely supported through the medium of their rollers, on rollers such as 21 and 22 of drive shafts 24 and 25 and on intermediate rollers such as 26. In some instances it may be desirable to apply forced cooling to the rollers such as 16 and 17. This is accomplished by directing air from a manifold 30 into the ends of the tubular shafts 18 and 19, as indicated.

As will be observed from Fig. 3 the rollers such as 26 are supported on vertically adjustable brackets, such as 27, mounted on a frame 31, and that by changing the height of such brackets the lateral spacing of rollers such as 16 and 17 can be modified in accordance with the need of the diameter of work to be supported. Also, it will be observed that rollers 16 and 17 are so positioned on their shafts that they can overlap one another and avoid their interference with the close spacing of shafts 18 and 19. Moreover, since the shafts such as 18 and 19 are freely supported they can be readily lifted from the assembly and replaced with similar shafts provided with other rollers when occasion requires. As will be understood the length of the runway may be such as to embody a substantial number of the shafts such as 18 and 19 arranged in end to end relation, although in Fig. 1 only two of each such shafts are indicated.

The drive shafts 24 and 25 extend the full length of the frame 31 and are driven by a variable speed motor 35 through the medium of a gear reduction unit 36 and drive chains 32 and 38 respectively.

As will be understood the speed of rotation of the work being drawn usually varies with the work diameter and/or rate of draw, and the speed of rotation of motor 35 is in all instances adjusted to cause the rollers such as 16 and 17 to impart a turning movement to the work in accordance with that imparted thereto by a drawing tractor 40.

Although the preferred form of the invention is shown and described, it will be understood that by sacrificing certain refinements thereof the basic advantages of a positive turning torque to the tubing at the entrance end of the runway can be retained in a much simplified structure. For example, the entrance end of the runway might well comprise two graphite faced rollers of substantial length mounted on driven shafts laterally spaced just sufficiently to afford clearance between the rollers. Alternatively, such shafts can be brought closer to one another by placing on each shaft a group of short rollers in overlapping relation with those on the other shaft. Such alternative structures are considered well within the concept of the invention as claimed.

What is claimed is:

1. In a runway suitable for supporting a continuous cylindrical body of glass during its travel from a source of formation to a delivery position, a pair of drive shafts arranged in laterally spaced relation along paths parallel to and on opposite sides of the desired path of travel of such body and each having drive rollers arranged in spaced relation along its length, other rollers rotatable about axes parallel to and directly below such path, a second pair of shafts having body supporting rollers spaced along their lengths the rollers of one shaft of the latter pair resting jointly on the rollers on one shaft of the first pair and on said other rollers, the rollers of the other shaft of the latter pair similarly resting jointly on the rollers of the other shaft of the first pair and on said other rollers, the rollers on said second pair of shafts jointly providing the support for such body, and means for driving said first pair of shafts to effect rotation of the rollers on said second pair of shafts to thereby impart a rotative force to a supported body.

2. A support such as defined by claim 1 wherein the other rollers are vertically adjustable to modify the distance between the second pair of shafts and their rollers.

3. A support such as defined by claim 2 wherein the rollers on said second pair of shafts are so positioned thereon as to overlap one another when said other rollers are adjusted to their lowermost position.

4. A support such as defined by claim 1 wherein the shafts of the second pair are tubular and means is provided for passing a cooling medium therethrough.

5. A support such as defined by claim 1 wherein the second pair of shafts is one of a series thereof arranged in end to end relation.

6. Horizontally disposed means for supporting a cylindrical glass body during its travel from its source of formation to a drawing mechanism adapted to turn such body about its own axis as drawing takes place, comprising a pair of rollers rotatable about shafts arranged parallel to the axis of the path for the body to be supported and spaced to cradle the body therebetween, other rollers in part supporting said pair of rollers, means including at least one of said other rollers for rotating at least one roller of said pair at a surface speed corresponding to that imparted to the supported body by the drawing mechanism, and vertically adjustable means cooperative with said other rollers in the support of said pair of rollers in any of a varied number of spaced relations.

References Cited in the file of this patent
UNITED STATES PATENTS

| | | |
|---|---|---|
| 980,052 | Blevney et al. | Dec. 27, 1910 |
| 1,791,404 | Fahrenwald | Feb. 3, 1931 |
| 1,876,031 | Soubier | Sept. 6, 1932 |
| 1,948,560 | Borneman | Feb. 27, 1934 |
| 1,951,993 | Pond | Mar. 20, 1934 |
| 2,009,326 | Sanchez-Vello | July 23, 1935 |
| 2,141,456 | Woods | Dec. 27, 1938 |
| 2,310,474 | Terchmann | Feb. 9, 1943 |
| 2,438,448 | Morton et al. | Mar. 23, 1948 |
| 2,653,720 | Robertson | Sept. 29, 1953 |